US012432482B2

(12) United States Patent
Liu

(10) Patent No.: US 12,432,482 B2
(45) Date of Patent: Sep. 30, 2025

(54) MAGNETIC SUCTION HEADPHONE WITH REPLACEABLE HEADPHONE CASE TRIM

(71) Applicant: Dongguan Beiou Intelligent Technology Co., Ltd., Dongguan (CN)

(72) Inventor: Yiyong Liu, Dongguan (CN)

(73) Assignee: Dongguan Beiou Intelligent Technology Co., Ltd., Dongguan (CN)

( * ) Notice: Subject to any disclaimer, the term of this patent is extended or adjusted under 35 U.S.C. 154(b) by 336 days.

(21) Appl. No.: 18/201,824

(22) Filed: May 25, 2023

(65) Prior Publication Data

US 2023/0388697 A1 Nov. 30, 2023

(30) Foreign Application Priority Data

May 25, 2022 (CN) ......................... 202221286582.0

(51) Int. Cl.
*H04R 5/033* (2006.01)
*H04R 1/10* (2006.01)

(52) U.S. Cl.
CPC ......... *H04R 1/1058* (2013.01); *H04R 1/1066* (2013.01); *H04R 1/1091* (2013.01)

(58) Field of Classification Search
CPC .... H04R 1/1008; H04R 5/033; H04R 5/0335; H04R 2201/105; H04R 2225/77; A61F 11/14
See application file for complete search history.

(56) References Cited

U.S. PATENT DOCUMENTS

| | | | | |
|---|---|---|---|---|
| 7,292,704 | B2 * | 11/2007 | Lederer ................ | G01R 33/283 600/410 |
| 9,736,563 | B1 * | 8/2017 | Glass ..................... | H04R 5/033 |
| 2008/0152180 | A1 * | 6/2008 | Tsai ...................... | H04R 1/2834 381/345 |
| 2010/0128885 | A1 * | 5/2010 | Roos ...................... | A61F 11/14 381/72 |
| 2013/0142376 | A1 * | 6/2013 | Lin ...................... | H04R 1/1008 381/373 |
| 2013/0272560 | A1 * | 10/2013 | Dougherty ........... | H04R 1/1066 381/378 |
| 2013/0294633 | A1 * | 11/2013 | Steyn .................. | H04R 1/1083 381/370 |
| 2014/0376765 | A1 * | 12/2014 | Toelle .................. | H04R 1/1016 381/384 |
| 2015/0222980 | A1 * | 8/2015 | Pizzaro ................ | H04R 1/1075 381/371 |

* cited by examiner

*Primary Examiner* — Ryan Robinson
(74) *Attorney, Agent, or Firm* — Bayramoglu Law Offices LLC

(57) ABSTRACT

A magnetic suction type headphone that can replace the headphone case decoration includes: a headphone body, where the headphone body is equipped with two, and the upper ends of the two headphone bodies are connected together through headbands. The side of the headband facing the headphone body is also equipped with a leather cover, and the back of the headphone body is equipped with a light guide plate. The side of the light guide plate facing the headphone body is fixed with a first magnet group, The back of the headphone body is also equipped with a decorative cover, and one side of the decorative cover is fixedly equipped with a second magnet group that matches the magnetic attraction of the first magnet group.

7 Claims, 3 Drawing Sheets

MAGNETIC SUCTION HEADPHONE WITH REPLACEABLE HEADPHONE CASE TRIM

CROSS REFERENCE TO THE RELATED APPLICATIONS

This application is based upon and claims priority to Chinese Patent Application No. 202221286582.0, filed on May 25, 2022, the entire contents of which are incorporated herein by reference.

TECHNICAL FIELD

The present disclosure relates to the field of electronic product technology, in particular to a magnetic suction headphone that can replace the headphone case decoration piece.

BACKGROUND

At present, the structure of headphones on the market is basically the same. If the selected decorations have a good response, they will fix the headphones into shape and cannot be disassembled or transformed for decoration. Therefore, the personalized performance of the product is poor, which fails to enable consumers to choose decorations independently, leading to a lack of product competitiveness and a decrease in economic benefits.

Therefore, there is an urgent need to design a magnetic suction headphone that can replace the headphone case trim to overcome the shortcomings of existing technology.

SUMMARY

The technical solution adopted by the present disclosure to achieve the above technical objectives is: a magnetic suction headphone that can replace the headphone case decoration, which is characterized in that it includes: a headphone body, the headphone body is equipped with two, the upper ends of the two headphone bodies are connected by a headband, the side of the headband facing the headphone body is also equipped with a leather cover, and the back of the headphone body is equipped with a light guide plate, The side of the light guide plate facing the headphone body is fixedly equipped with a first magnet group, and the back of the headphone body is also equipped with a decorative cover. One side of the decorative cover is fixedly equipped with a second magnet group that matches the magnetic attraction of the first magnet group.

In a preferred embodiment, the light guide plate is equipped with two first placement rings spaced apart on the side facing the headphone body, and the first magnet group is fixed within the first placement ring.

In a preferred embodiment, the side of the light guide plate away from the headphone body is provided with two positioning rings corresponding to the first placement ring.

In a preferred embodiment, the decorative cover is provided with two spaced second placement rings on one side facing the light guide, and the second magnet component is fixed within the second placement ring. The diameter of the second placement ring is smaller than the diameter of the positioning ring.

In a preferred embodiment, the outer wall of the second placement ring is equidistant with several limiting protrusions.

In a preferred embodiment, the protrusion length of the limit convex block is equal to the difference between the positioning ring and the second placement ring.

In a preferred embodiment, the bottom side of the decorative cover is provided with grooves.

The advantage of the present disclosure is that the installation of the decorative cover is achieved by setting a first magnet group on the light guide plate of the headphone body and a second magnet group matched with the first magnet group on the decorative cover. Users can replace the headphone at any time according to their needs, improve the product competitiveness of the headphone, improve the economic efficiency of the headphone, meet the user's usage needs, and have simple replacement and low cost.

BRIEF DESCRIPTION OF TILE DRAWINGS

IN THE PICTURE

10. Headphone body; 11. Headband; 12. Leather holster; 13. Light guide plate; 131. First magnet group; 132. First placement circle; 133. Positioning ring; 14. Decorative cover; 141. Second magnet group; 142. Second placement circle; 143. Limit convex block; 144. Groove.

DETAILED DESCRIPTION OF THE EMBODIMENTS

In order to make the above purposes, features, and advantages of the present disclosure more obvious and understandable, the specific implementation methods of the present disclosure will be explained in detail below in conjunction with the accompanying drawings. Many specific details are elaborated in the following description to facilitate a full understanding of the present disclosure. However, the present disclosure can be implemented in many different ways from the other described herein, and those skilled in the art can make similar improvements without violating the connotation of the present disclosure. Therefore, the present disclosure is not limited by the specific embodiments disclosed below.

Figure 1:
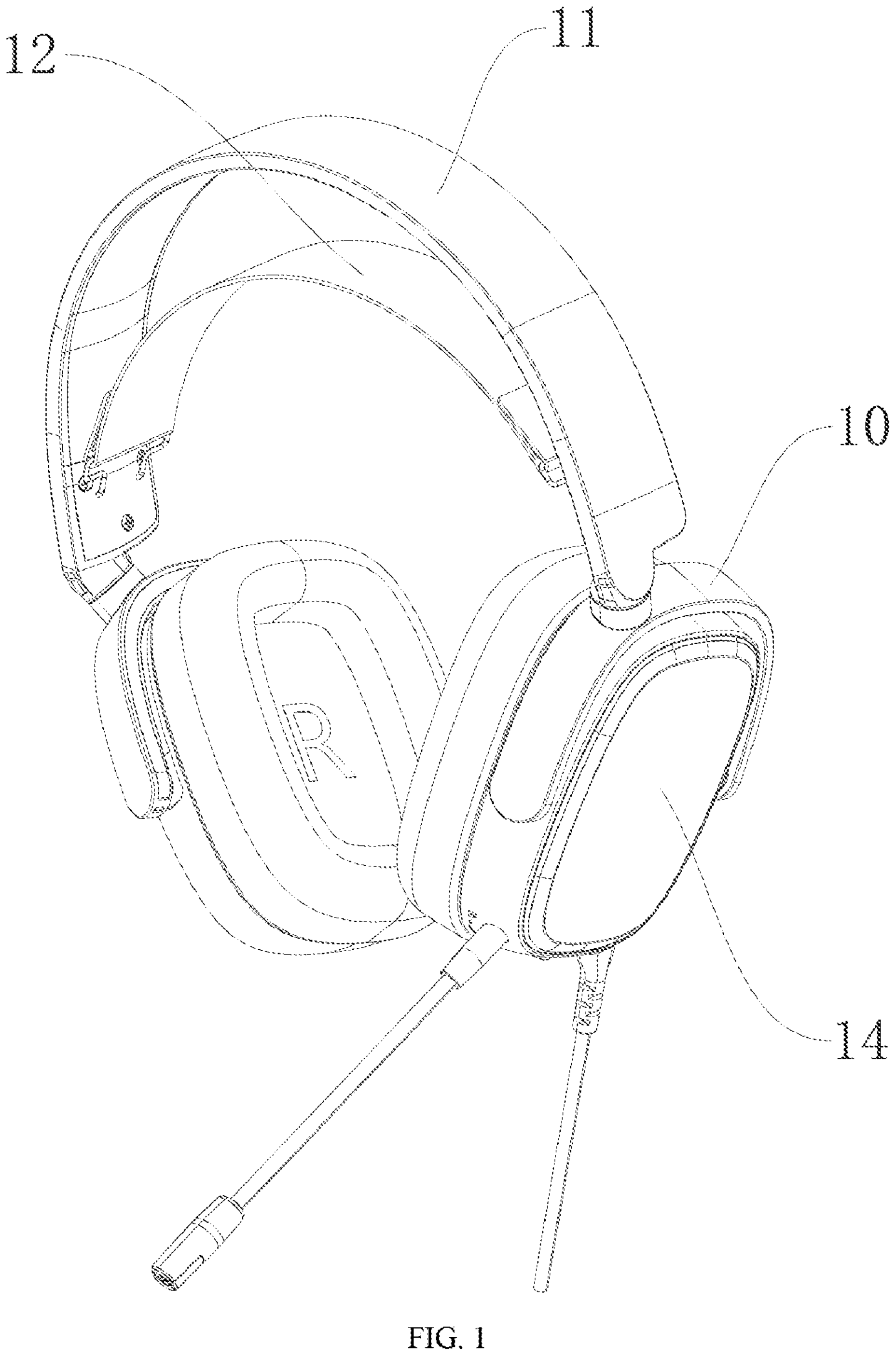
FIG. 1 is a structural schematic diagram of the present disclosure.
Figure 2:
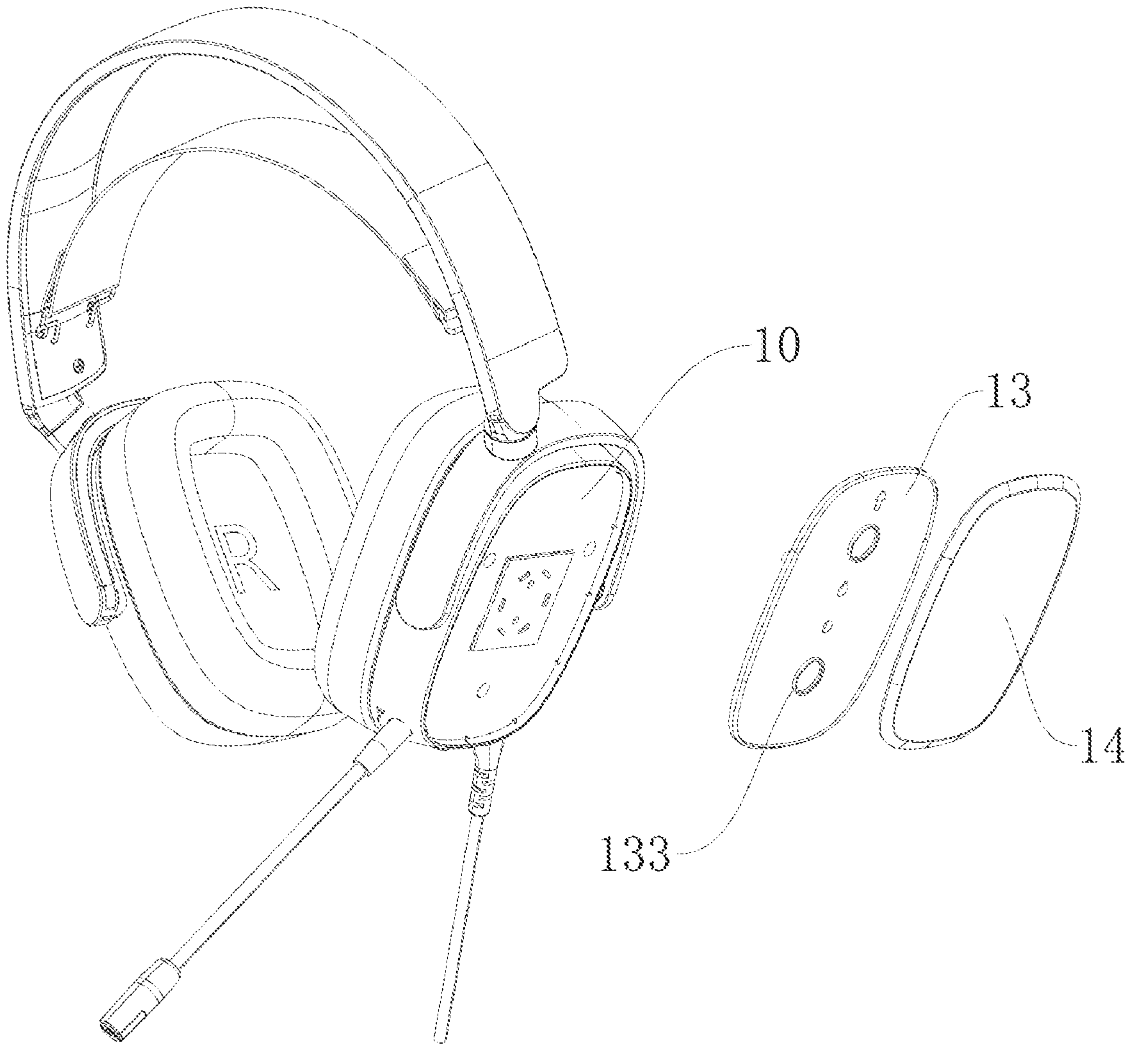
FIG. 2 is an exploded view from the first perspective of the present disclosure.
Figure 3:
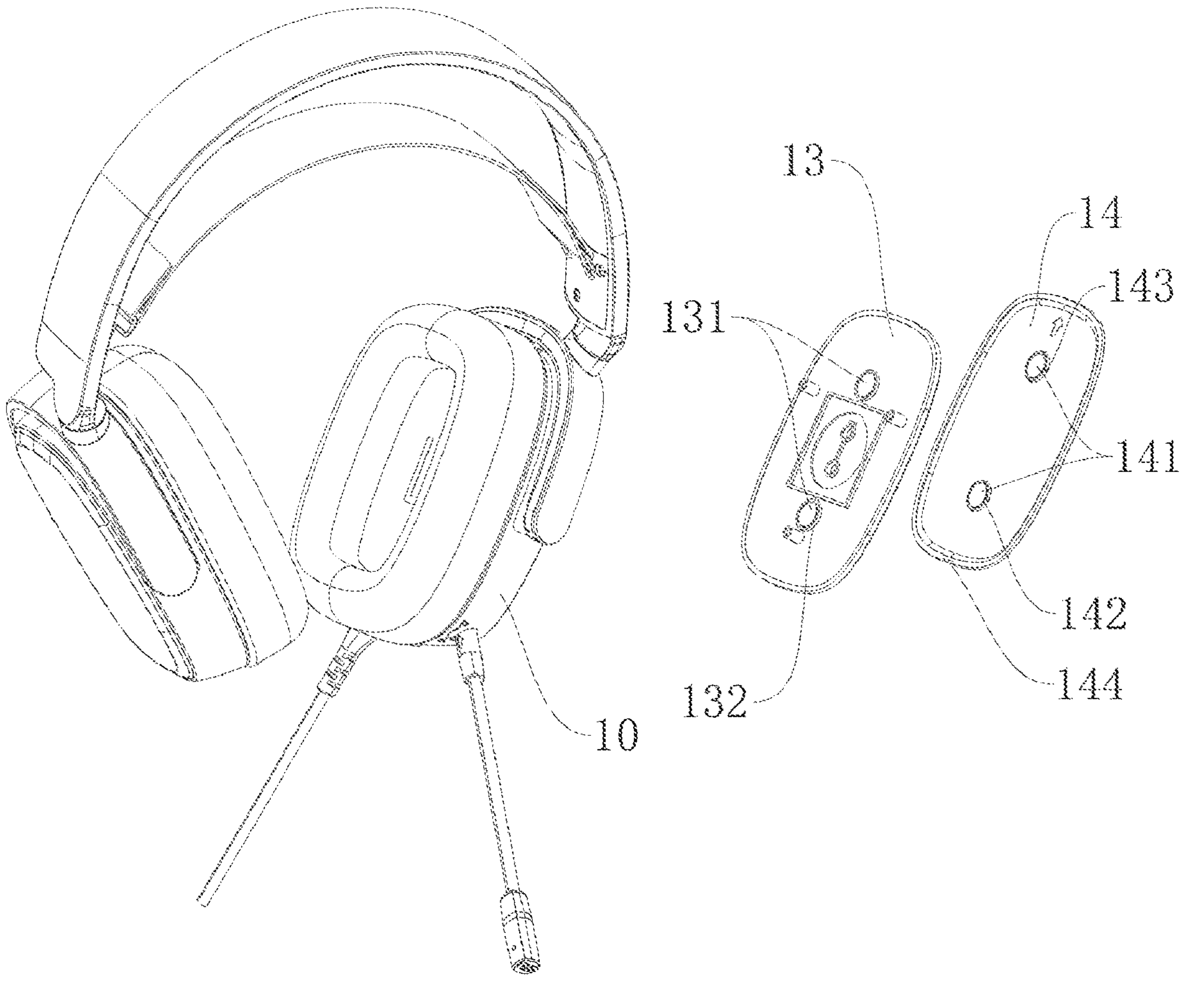
FIG. 3 is an exploded view of the second perspective of the present disclosure.

As shown in FIGS. 1 to 3, the present disclosure provides a magnetic suction headphone that can replace the headphone case decoration, including: a headphone body 10, where the headphone body 10 is equipped with two, and the upper ends of the two headphone bodies 10 are connected together through a headband 11. One side of the headband 11 facing the headphone body 10 is also equipped with a leather holster 12, and the back of the headphone body 10 is equipped with a light guide plate 13, The light guide plate 13 is fixed with a first magnet group 131 towards the side of the headphone body 10, and the back of the headphone body 10 is also equipped with a decorative cover 14. One side of the decorative cover 14 is fixed with a second magnet group 141 that matches the magnetic attraction of the first magnet group 131. Specifically, the decorative cover 14 is installed on the back of the headphone body 10 through the magnetic attraction of the first magnet group 131 and the second magnet group 141. When the decorative cover 14 needs to be replaced, Simply buckle down the decorative cover 14 to replace it, and both the first magnet group 131 and the second magnet group 141 use strong magnets to ensure the firmness of the magnet. Users can replace the it at any time according to their needs, improving the product competitiveness of the headphones, improving the economic efficiency of the headphones, and meeting the user's needs. The replacement is simple and cost-effective.

Furthermore, in this embodiment, the light guide plate 13 is equipped with two first placement circle 132 on the side facing the headphone body 10. The first magnet group 131 is fixed inside the first placement circle 132. Specifically, the first placement circle 132 is used to place the first magnet group 131 and fix the first magnet group 131 to prevent contact between the first magnet group 131 and other components, causing the first magnet group 131 to detach from the light guide plate 13.

Furthermore, in this embodiment, the side of the light guide plate 13 that is away from the headphone body 10 is provided with two positioning rings 133 corresponding to the first placement circle 132. Specifically, the side of the light guide plate 13 that is away from the first placement circle 132 is provided with a positioning ring 133, which corresponds to the first placement circle 132, The positioning ring 133 is used to guide the placement of the second magnet group 141 while facilitating the correspondence between the second magnet group 141 and the first magnet group 131.

Furthermore, the decorative cover 14 is equipped with two spaced second placement circle 142 on the side facing the light guide, and the second magnet group 141 is fixed inside the second placement circle 142. The diameter of the second placement circle 142 is smaller than the diameter of the positioning ring 133. Specifically, on the side facing the light guide, the decorative cover 14 is equipped with two spaced second placement circle 142 for placing the second magnet group 141, The diameter of the second placement circle 142 is smaller than the diameter of the positioning ring 133, so that when the decorative cover 14 is installed on the back of the headphone body 10, the second placement circle 142 can be located inside the positioning ring 133.

Furthermore, the outer wall of the second placement circle 142 is equidistant and equipped with several limit convex block 143. Specifically, in order to avoid pores caused by the diameter of the second placement circle 142 being smaller than the diameter of the positioning ring 133 when the second placement circle 142 is located inside the positioning ring 133, which can easily cause the decorative cover 14 to move when installed on the headphone body 10, several limit convex block 143 are equidistant on the outer wall of the second placement circle 142, When the second placement circle 142 is located inside the positioning ring 133, the limit convex block 143 is in contact with the inner wall of the positioning ring 133, thereby achieving fixation.

Furthermore, the convex length of the limit convex block 143 is equal to the difference between the positioning ring 133 and the second placement circle 142. Specifically, the convex length of the limit convex block 143 is equal to the difference between the positioning ring 133 and the second placement circle 142, so that the second placement circle 142 can be placed unobstructed into the positioning ring 133. When the second placement circle 142 is located within the positioning ring 133, the limit convex block 143 can contact the inner wall of the positioning ring 133.

Furthermore, the bottom side of the decorative cover 14 is provided with a groove 144. Specifically, an inner concave groove 144 is provided on the bottom side of the decorative cover 14. The setting of the groove 144 facilitates the use of fingers to buckle the decorative cover 14 out through the groove 144 when it is necessary to disassemble the decorative cover 14.

In summary, the present disclosure achieves the installation of the decorative cover 14 by installing a first magnet group 131 on the light guide plate 13 of the headphone body 10 and a second magnet group 141 matched with the first magnet group 131 on the decorative cover 14. Users can replace the it at any time according to their needs, improve the product competitiveness of the headphone, improve the economic efficiency of the headphone, meet the user's usage needs, and have simple replacement and low cost.

The present disclosure is not limited to the description in the specification and implementation methods, so it can easily achieve additional advantages and modifications for those familiar with the field. Therefore, without departing from the spirit and scope of the general concepts defined by the claims and equivalent scope, the present disclosure is not limited to specific details, representative devices, and the illustrated examples shown and described here.

What is claimed is:

1. A magnetic suction headphone with a replaceable headphone case trim, comprising a headphone body, wherein the headphone body is equipped with two, and upper ends of the two headphone bodies are connected together through headbands;

a side of the headband facing the headphone body is further equipped with a leather cover, and a back of the headphone body is equipped with a light guide plate; and a side of the light guide plate facing the headphone body is fixed with a first magnet group, the back of the headphone body is further equipped with a decorative cover, and one side of the decorative cover is fixed with a second magnet group, wherein the second magnet group is matched with the first magnet group in a magnetic attraction.

2. The magnetic suction headphone according to claim 1, wherein the light guide plate is equipped with two first placement rings spaced towards the headphone body, and the first magnet group is fixed inside each of the two first placement rings.

3. The magnetic suction headphone according to claim 2, wherein a side of the light guide plate away from the headphone body is equipped with two positioning rings corresponding to the two first placement rings.

4. The magnetic suction headphone according to claim 3, wherein the decorative cover faces the light guide plate and is equipped with two second placement rings spaced apart;

the second magnet group is fixed inside each of the two second placement rings, and a diameter of each of the two second placement rings is smaller than a diameter of each of the two positioning rings.

5. The magnetic suction headphone according to claim 4, wherein an outer wall of each of the two second placement rings is equidistant with a plurality of limiting protrusions.

6. The magnetic suction headphone according to claim 5, wherein a protrusion length of each of the plurality of limiting protrusions is equal to a difference between each of the two positioning rings and each of the two second placement rings.

7. The magnetic suction headphone according to claim 1, wherein a bottom side of the decorative cover is provided with a groove.

* * * * *